H. G. GROSSE & W. FRENCH.
IRONING MACHINE.
APPLICATION FILED JULY 9, 1909.
Reissued May 30, 1911.
13,249.
2 SHEETS—SHEET 1.
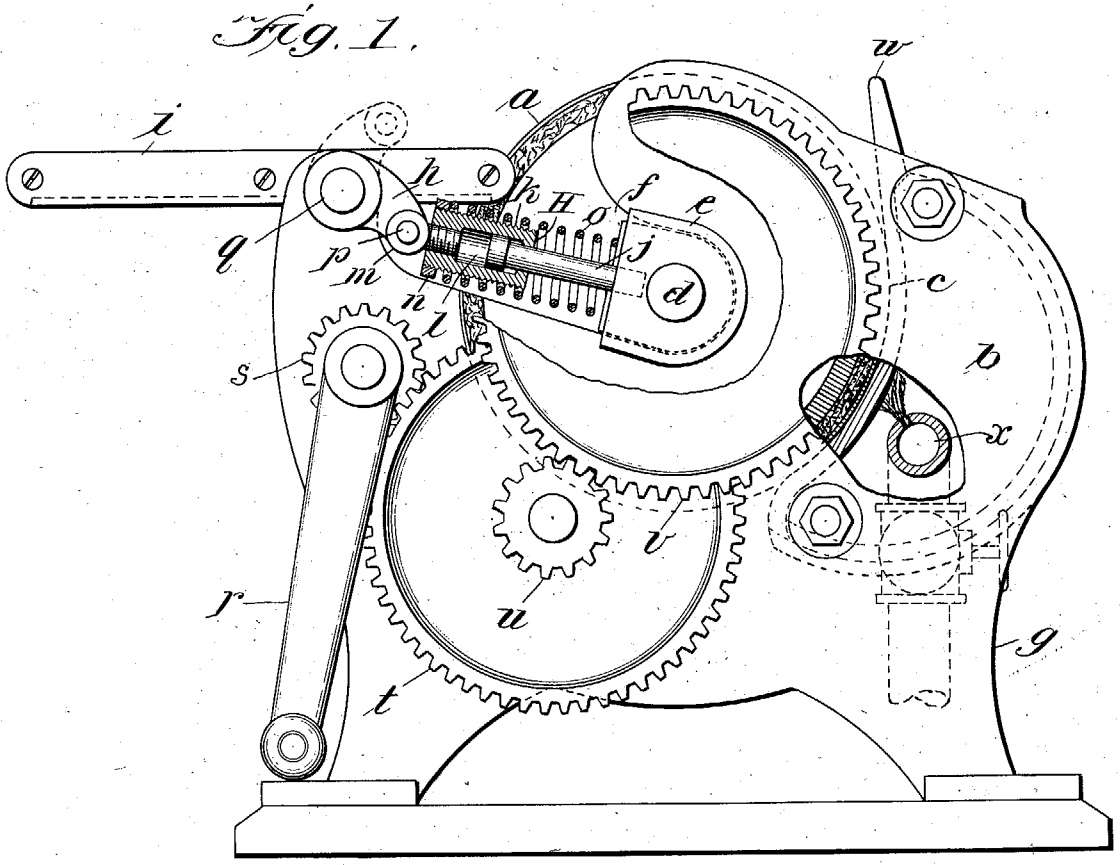
Witnesses:
Harry S. Gaither
W. Goldberger
Inventors:
Herman G. Grosse and
Walter French
by William L. Hall, atty H. G. GROSSE & W. FRENCH.
IRONING MACHINE.
APPLICATION FILED JULY 9, 1909.
Reissued May 30, 1911. 13,249.
2 SHEETS—SHEET 2.
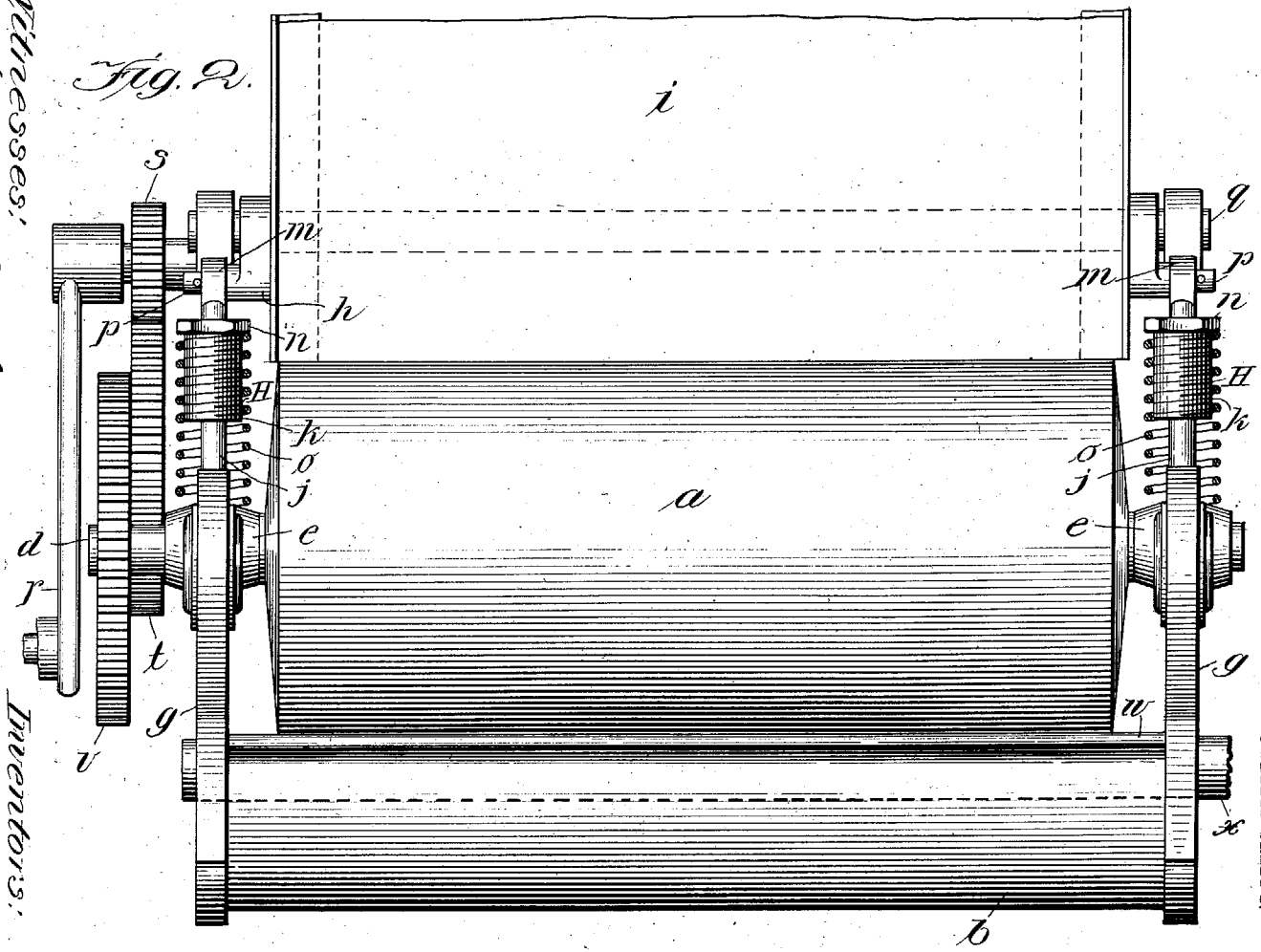
Witnesses:
Harry S. Gaither
W. Goldberger
Inventors:
Herman G. Grosse and Walter French
by William H. Hall, atty

UNITED STATES PATENT OFFICE.

HERMAN G. GROSSE AND WALTER FRENCH, OF CHICAGO, ILLINOIS, ASSIGNORS TO AMERICAN IRONING MACHINE CO., OF CHICAGO, ILLINOIS, A CORPORATION OF ILLINOIS.

IRONING-MACHINE.

13,249. Specification of Reissued Letters Patent. Reissued May 30, 1911.

Original No. 859,290, dated July 9, 1907, Serial No. 266,198. Application for reissue filed July 9, 1909. Serial No. 506,844.

*To all whom it may concern:*

Be it known that we, HERMAN G. GROSSE and WALTER FRENCH, citizens of the United States, and residing at Chicago, county of Cook, State of Illinois, have invented certain new and useful Improvements in Ironing-Machines; and we hereby declare the following to be a full, clear, and exact description of the invention, reference being made to the accompanying drawings, and to the characters of reference marked thereon, which form part of this specification.

Our invention relates to improvements in ironing machines and the invention relates more specifically to that type of machines embracing a heating shoe or chamber and a rotative drum between which and the shoe the articles to be pressed are passed by the rotation of the drum.

The invention consists in the matters hereinafter set forth and more particularly pointed out in the appended claims.

Among the objects of the invention is to provide a novel mechanism for separating the drum and shoe and thus prevent the drum from becoming overheated when the machine is idle, and so arranged as to regulate the pressure of the drum on the work passing between the same and the shoe.

A further object of the invention is to provide a construction and arrangement of the shoe and drum relatively to the feed table which facilitates the feeding of the work to the space between the drum and shoe.

Another object of the invention is to so arrange the shoe relatively to the drum as to facilitate the heating of the ironing surface of the shoe.

In the drawings, Figure 1 is an end elevation of the machine, with parts broken away and other parts shown in section. Fig. 2 is a top plan view, with parts shown in section.

The shaft *d* of the drum *a* is rotatively mounted in bearings *e* carried by the end pieces or standards *g* of the machine and the heating chamber *b* is supported at its ends on said standards *g* behind the drum and is formed with a forwardly facing concave ironing surface or shoe *c* between which and the drum the work is passed to iron the same. At the front of the drum and above its center is located a feed table, it being supported on a shaft *q* that is rotatively mounted at its ends in said standards, whereby the table may swing vertically. To one end of the drum shaft *d* is fixed a large gear wheel *v* which meshes with a pinion *u* which rotates with a second large gear wheel *t* that meshes with a pinion *s* that is rotated by a crank *r*. Power applied to said crank operates through said gears to rotate the drum.

Referring now to the manner of mounting the drum shaft bearings and to the means for separating the drum from the shoe, said parts are made as follows. The said drum shaft bearings slide or reciprocate in slots *f* in the end-pieces or standards *g*. The said bearings are operatively connected with the feed table in such a way that when the table is in its upper or horizontal position the drum is pressed toward the ironing shoe *c* and when the table is swung downwardly the drum is pulled away from the shoe, and the connecting mechanisms are such that the drum is locked in its backward position when the table is swung upwardly and the force by which the drum is pressed backward toward the shoe may be regulated. Said bearings *e* are attached to said connecting mechanisms, designated each as a whole by H, and are thereby connected to levers *h* mounted on the ends of the feed table shaft, the said shaft, levers and crank pins forming part of the swinging feed table *i*. Each of said connecting mechanisms embraces a headed rod *j* attached at its rear end to the drum bearing *e* after it has passed through a cylinder *k*, the rear end of which cylinder is apertured for the passage of said rod. The head of said rod slides in a chamber *l* in said cylinder. The forward end of the cylinder *k* is internally threaded to receive the shank of the eye-bolt *m* which thus is fixedly secured to said sleeve. Said eye-bolt *m* engages over the crank pin *p* of the lever *h* and constitutes a pivotal connection between said cylinder and the table shaft lever *h*. The said cylinder is also externally screw-threaded and is provided with a nut *n* between which and the bearing *e* is interposed a coiled spring *o* which surrounds the rod *j* and the cylinder *k*. By means of the nuts *n* the spring pressure between said bearings and nuts may be varied, whereby the pressure of said drum *a* against the ironing shoe may be regulated.

The crank pins *p* are so placed relatively to the axis of the feed table shaft *q* that in one position (the full line position shown in Fig. 1) they are below a plane which passes through said axis and the axis of the drum, and when in the other position (the dotted line position shown in Fig. 1) they are above said plane. Therefore when the levers *h* and crank pins *i* are below said plane the drum is pressed toward the shoe and the table is held in its horizontal position, remaining steadily in this position while the connected drum may yield away from the shoe. When the levers *h* are swung upwardly to the dotted line position shown in Fig. 1, as by swinging the table *i* downwardly, the spring-force of the connecting mechanisms H is released and the drum shaft bearing boxes *e* are drawn away from the lower ends of the slots *f*, thus drawing the ironing drum *a* forwardly away from the shoe *c* of the heating chamber *b*, whereby the said drum is saved from becoming overheated while standing idle. The slots *f* in which the bearings *e* reciprocate are so arranged as to keep the teeth of the wheels *u* and *v* in constant meshing engagement.

In this machine the work passes over the table *i* and over the top of the drum and is caught by the lip or ledge *w*, which projects from the top of the heater *b* and which, as herein shown, forms part of the shoe *c*. The friction of the padded drum *a* passes the work down between said drum and shoe and delivers the work forwardly from said shoe as it is discharged from the machine. It will be observed that the drum, which is of relatively large diameter, has a large exposed surface between the table and the guiding lip *w*, and the friction of this padded surface of the drum catches the work and draws the work firmly and evenly over the drum to said ledge by which latter it is guided into the space between the drum and shoe.

A pipe *x* forms, within the chamber *b*, a gas burner for heating the ironing shoe *c*. In the most effective construction, as here shown, the axis of the drum *a* is about ten to twenty degrees above the longitudinal central axis of the surface or shoe *c* or longitudinal axis of the chamber *b*, in which situation the heat catches the shoe most strongly while at the same time the table *i*, the drum *a* and the chamber *b*, are situated in a nearly horizontal position, one in which it is the most easy to handle the work and at the same time give the best heat results. That is to say the ironing surface or shoe of the chamber is inclined rearwardly with respect to the path of the flame issuing from the burner so that the flame plays upon the shoe in a manner to effectively heat the same, notwithstanding the general vertical arrangement of the shoe.

We claim as our invention:

1. The combination with an ironing shoe having means for heating it and a drum in front of and reciprocable toward and from said shoe, of a swinging feed table in front of the drum over which the work is fed, and yieldable connecting mechanism between the table and the shaft bearings of the drum arranged to move the drum toward and from the shoe by the swinging movement of the table.

2. The combination with a reciprocable drum and a heating-chamber behind said drum, of a shaft-borne rotary feeding-table in front of said heater and drum, cranks to the ends of said shaft, and yielding connecting-mechanism between the crank-pins of said cranks and shaft bearings of said drum, to forcibly contact and to separate said heater and drum and to fix the position of said table by the position of said drum.

3. The combination with a reciprocable drum and a heating-chamber behind said drum, of a shaft-borne rotary feeding table in front of said heater and drum, cranks to the ends of said shaft and yielding connecting-mechanism between the crank-pins of said cranks and shaft-bearings of said drum, said crank-pins set to be below a plane passing through the axes of the table-shaft and drum when the table is horizontal and to be above said plane when the table is vertical and the drum and the heater are separated.

4. The combination with an ironing shoe having means for heating it and a drum in front of and reciprocable toward and from said shoe, of a rock shaft, cranks fixed to the ends of said shaft and yielding connecting mechanisms between the cranks and the shaft bearings of the drum, arranged to yieldingly press the drum against the shoe and to positively withdraw it from contact with the shoe, the cranks being so arranged relatively to the axes of said shaft and drum as to lock the drum yieldingly pressed toward the shoe.

5. The combination with an ironing shoe and a drum in front of and reciprocable toward and from the shoe, and having means for positively moving it away from the shoe and for locking it up against the shoe, of a swinging feed table in front of the drum over which the work is fed to the drum and connected with the drum so as to be swung downwardly below its normal position when the drum is moved away from the shoe, there being a spring arranged between the drum and the means which actuates it to move it toward and away from the shoe, arranged to be placed under compression, when the drum is locked against the shoe, to permit the drum to yield away from the shoe against the action of said spring.

6. The combination with an ironing shoe having means for heating it, of a rotary drum arranged in front of the shoe and a feed table in front of the drum over which the work is fed to the upper part of the drum, the shoe being provided at its upper side with a guide lip arranged below and in rear of the topmost surface of the drum to guide the work between the shoe and drum and the said feed table being arranged below the topmost surface of the drum and above the plane of the axis of the drum, whereby a large portion of the top of the drum is exposed for frictional contact with the work to frictionally pull the work to the space between said drum and shoe.

In testimony, that we claim the foregoing as our invention we affix our signatures in the presence of two witnesses.

HERMAN G. GROSSE.
WALTER FRENCH.

Witnesses:
WILLIAM L. HALL,
WILLIAM GOLDBERGER.